US008820260B2

(12) United States Patent
Brizzolara

(10) Patent No.: US 8,820,260 B2
(45) Date of Patent: Sep. 2, 2014

(54) WATERCRAFT DEVICE

(76) Inventor: Stefano Brizzolara, Genoa (IT)

( * ) Notice: Subject to any disclaimer, the term of this patent is extended or adjusted under 35 U.S.C. 154(b) by 316 days.

(21) Appl. No.: 13/362,298

(22) Filed: Jan. 31, 2012

(65) Prior Publication Data

US 2012/0192781 A1 Aug. 2, 2012

(30) Foreign Application Priority Data

Feb. 1, 2011 (IT) .............................. GE2011A0012

(51) Int. Cl.
- *B63B 1/28* (2006.01)
- *B63B 1/30* (2006.01)
- *B63B 1/24* (2006.01)
- *B63B 1/10* (2006.01)

(52) U.S. Cl.
CPC ... *B63B 1/30* (2013.01); *B63B 1/24* (2013.01); *B63B 1/107* (2013.01)
USPC ........................................................ 114/280

(58) Field of Classification Search
CPC ............ B63B 1/00; B63B 1/042; B63B 1/10; B63B 1/12; B63B 1/121; B63B 1/16; B63B 1/18; B63B 1/20; B63B 1/24; B63B 1/242; B63B 1/248; B63B 1/26
USPC ................ 114/271, 274, 278, 283, 292, 56.1, 114/61.1, 61.12, 61.14, 280
See application file for complete search history.

(56) References Cited

U.S. PATENT DOCUMENTS

| | | | | | |
|---|---|---|---|---|---|
| 3,447,502 | A | * | 6/1969 | Leopold | 114/61.14 |
| 3,623,444 | A | * | 11/1971 | Lang | 114/277 |
| 3,817,199 | A | * | 6/1974 | Schirtzinger | 114/42 |
| 3,830,178 | A | * | 8/1974 | Lang | 114/61.14 |
| 3,866,557 | A | * | 2/1975 | Lang | 114/61.12 |
| 3,897,744 | A | * | 8/1975 | Lang | 114/61.14 |
| 3,898,946 | A | * | 8/1975 | Zadrozny et al. | 114/61.13 |
| 4,552,083 | A | * | 11/1985 | Schmidt | 114/61.13 |
| 4,557,211 | A | * | 12/1985 | Schmidt | 114/61.13 |
| 4,606,291 | A | * | 8/1986 | Hoppe | 114/274 |
| 4,615,291 | A | * | 10/1986 | Jones | 114/280 |
| 4,771,716 | A | * | 9/1988 | Dat | 114/39.24 |
| 4,802,428 | A | * | 2/1989 | Lang | 114/283 |
| 4,926,773 | A | | 5/1990 | Manor | |

(Continued)

FOREIGN PATENT DOCUMENTS

| | | |
|---|---|---|
| FR | 2833238 | 6/2003 |
| RU | 2177423 | 12/2001 |
| RU | 2177425 | 12/2001 |
| WO | 03082662 | 10/2003 |

*Primary Examiner* — Daniel V Venne

(74) *Attorney, Agent, or Firm* — Themis Law

(57) ABSTRACT

A watercraft device according to the invention includes a central body and two lateral hulls, each having a shape optimized to reduce resistance to the advance motion and connected to the central body through at least one connecting arm, causing the central body to be in raised position with respect to the lateral hulls. The connecting arms have a given angle from the horizontal plan of the device, and the lateral hulls and the central body are oriented with longitudinal axes, or axes in the bow-stern direction, essentially parallel to each other. The central body connecting the lateral hulls is shaped like wing, which helps in sustaining the weight of the vehicle at high speed and exploits ground effect to increase aerodynamic efficiency. In addition, each of the lateral hulls has one or more mobile and/or fixed hydrofoil elements that extend below the corresponding lateral hull.

28 Claims, 9 Drawing Sheets

(56) References Cited

U.S. PATENT DOCUMENTS

| | | | | |
|---|---|---|---|---|
| 4,944,238 A | * | 7/1990 | Lang | 114/61.14 |
| RE33,359 E | * | 10/1990 | Lang | 114/283 |
| 5,313,906 A | * | 5/1994 | Zapka | 114/274 |
| 5,673,641 A | | 10/1997 | Sournat | |
| 5,794,558 A | * | 8/1998 | Loui | 114/274 |
| 6,435,123 B1 | | 8/2002 | Ødegaard | |
| 7,743,720 B1 | * | 6/2010 | Salani | 114/61.1 |
| 2008/0127874 A1 | | 6/2008 | Daley | |

* cited by examiner

WATERCRAFT DEVICE

FIELD OF THE INVENTION

The present invention relates to a watercraft device that includes a central body and two lateral hulls. Each lateral hull is connected to the central body through at least one connecting arm, so that the central body is in a raised position with respect to the two lateral hulls. The connecting arms have a given angle from the horizontal plane of the device, and the two lateral hulls and the central body are oriented with their longitudinal axes, or axes in the direction of the bow-aft, essentially parallel to each other.

BACKGROUND OF THE INVENTION

The above described configuration belongs to boat devices known under as "SWATH" (Small Waterline Area Twin Hull).

These watercrafts are types of vessels that generally have two lateral hulls, namely a Twin Hull, shaped to decrease the area of that part of the hull that is intersected by the surface of the sea during navigation.

Consequently, when a SWATH vehicles is encountered by a surface wave, compared to an equivalent conventional hull (both monohull or catamaran), it is subject to a substantially smaller change in displaced volume of the hull (positive or negative depending on whether the vessel is on the crest or through of the wave) and hence to a smaller buoyant component of the wave exciting force, which is usually the major cause of wave induced ship motions. Therefore, the SWATH vessels have an inherent greater platform stability in waves, which means navigating in relatively high sea states with reduced pitch and heave motions compared to equivalent monohull or catamaran vessels.

In fact, during navigation, the main body of the SWATH is emerged while the two lateral hulls, displacing the majority of the volume, are submerged below the free surface. They are responsible for the increase in stability in sea waves, because they are affected by wave action to a lesser extent than the traditional craft, due to their smaller waterline area.

Consequently, the SWATH watercraft devices appear as a platform that is supported and conducted by two submerged hulls connected to the platform by one or more arms per submerged hull, very slender in the longitudinal direction (fore-aft) or correspondingly thin in the radial direction perpendicular to the longitudinal direction.

Despite a higher seakeeping performance, all the above described SWATH configurations suffer from an increase in resistance to the advance motion and consequently of higher fuel consumption compared to equivalent conventional vessel. Conversely, at a given installed power SWATH vessels can reach a substantially lower maximum speed in calm water, if remaining in the displacement mode (i.e. with their weight supported by the buoyancy force, substantially due to the displaced volume of the submerged hulls).

Moreover, similarly to all displacement and semi-displacement hulls, SWATH vessels are usually not suitable to achieve high relative velocities.

A significant parameter is the Froude number, calculated on the length $FnL=Vel/radg (g*L)$ and on the displaced volume at rest, $FnV=Vel/radg (g*V)$, where Speed=speed of advance, g=gravity acceleration, V=volume displaced by the hull at rest (weight of the device/density of the water), L=total hull length. The operating limit for a displacement/semidisplacement hull is around $FnL=0.6/0.8$ to about 1.0 (in the case of the SWATH hull form with innovative annular constriction subject matter of this patent), or $FnV=2.0/3.0$.

When the Froude numbers, or the speed relative to length or displacement, becomes too high, the displacement or semi-displacement hull, having typical hull forms shaped to be efficient in a low speed range, are abandoned and, to ensure an acceptable resistance at high speed, the form of planing hulls are adopted.

However, it is well known that planing hulls suffer in rough seas, reacting with large motions and violent impacts on the incident waves and at high speeds (corresponding to $FnL>1.0$) and becoming practically inoperable in sea waves (even moderate sea state two or three), due to the high accelerations experienced by the vessel and the high impact forces on the waves.

Therefore, there is an unsatisfied need to create a watercraft device that, at the same time, has very good sea-keeping characteristics (reduced motions in rough seas) and reduced resistance to advance motion in two speed regimes, one corresponding to the displacement mode and the other typical of planing hulls, significantly increasing the upper limit of operation of the latter, in terms of maximum speed (over 80 knots) in a relatively low sea state.

This allows reaching high speeds in navigation, even higher than traditional monohull and catamarans vessels, maintaining, at least at low speeds, a level of stability in waves comparable to that of SWATH devices according to the state of the art.

SUMMARY OF THE INVENTION

The invention achieves the above purposes of realizing a watercraft device that effectively combines the typical advantages of SWATH vessels, with a reduced resistance at high speeds, by utilizing an unconventional underwater hull shape that can withstand moderate sea states, typical of hydrofoil crafts, and further with aerodynamic efficiency of a wing in the air, which makes use of the ground effect to produce lift with a very high aerodynamic efficiency (i.e. low induced drag).

The result of this combination is an absolutely new watercraft device that properly combines the above described physical principles in order to provide the maximum seakeeping performance in both operating conditions: at medium-low speeds, in displacement mode navigation, through an innovative SWATH hull form; and at high or very high speeds with an appropriate lifting force distribution between the hydrofoils in water and in the wing in air.

Due to the particular design of the hydrofoils, featuring hybrid profiles suitable to operate as efficiently in both sub-cavitating and supercavitating regimes, and the appropriate lifting force distribution between the hydrofoils and the wing in air, the vessel is designed to reach speeds over 100 knots in moderate sea states, never reached so far even by the most advanced hydrofoils.

As mentioned, each of the at least two lateral hulls has at least one hydrofoil element to be deployed from its bottom part. This element shaped as a supercavitating hydrofoil extends in a direction substantially perpendicular to the longitudinal axis of each lateral hull. In one possible execution, the at least two hydrofoil elements extend toward the opposite vessel and are positioned at some distance from the fore and aft end of the relative lateral hull, so facing each other. In fact, according to the first possible version of the invention, each of the at least two hydrofoil elements per lateral hull has its tip end touching the corresponding opposite hydrofoil tip end, so that the at least two couple of hydrofoil elements are joined together to form a single hydrofoil surface, spanning from one lateral hull to the opposite lateral hull. They are inclined with a positive dihedral angle with respect to the true horizontal plane.

In another embodiment of the invention, the at least two hydrofoil elements are placed at suitable distance of from the fore and aft end of the relative lateral hull, so to face each other another, but this time they are extending toward the outside of the vessel, being inclined with a negative dihedral angle, with respect to the true horizontal plane.

The addition of the hydrofoil elements below the lateral hulls of the vessel allows the watercraft device, object of the present invention, to reach very high speeds in the so called 'foilborne' navigation mode in which the vessel is literally flying being sustained by these hydrofoil elements in water. In particular, these hydrofoil elements provide a dual mode to the watercraft device as a function of the speed.

At low speeds the watercraft device is similar to a traditional SWATH vessel, with very limited motions in waves, providing an emerged part consisting of the center body and of a portion of the connecting arms; and a submerged part which includes the remaining part of the connecting arms, the two lateral hulls and the relative hydrofoil elements.

When speed increases, the watercraft device changes its configuration into a hydrofoil, by deploying the hydrofoils. Above a certain speed, the lift developing by the hydrofoil elements causes the total emersion of the whole watercraft device with a consequent reduction of drag, allowing the device to reach very high speeds, which can touch 120 knots.

Consequently, the watercraft device object of the present invention provides a very wide range of operability, featuring excellent operating conditions for speeds between, say, 6 and 120 knots.

In a preferred embodiment, a watercraft device according to the present invention, requires that each hydrofoil element can rotate around the longitudinal axis of the lateral hull it is connected to through a pivoting joint, so to be moved from an immersed active condition to an inactive condition. In the immersed active condition, each hydrofoil element is positioned entirely below the relative lateral hull and connects with the opposite hydrofoil element, as described above, to form a single continuous hydrofoil surface.

Consequently hydrofoil elements can rotate around a longitudinal axis, assuming an appropriate dihedral angle, depending on the speed and angle of trim you want to keep.

In the inactive condition instead each hydrofoil element is rotated toward the inside of the vessel, so that at least the end facing the opposite lateral hull is in a higher position than the opposite lateral hull.

That is, from a condition in which they are connected, the two hydrofoils ends are raised out of the water rotating around the corresponding rigid lateral hull where the hydrofoil element is hung on.

This particular configuration allows the device to further increase the stability of the vessel at low speeds. In fact, through the swinging out of the hydrofoil elements the device becomes a real SWATH, ensuring high stability at low speeds. In addition, for both hydrofoil configurations, those facing inwards and those facing outward, there is the possibility of rotating the hydrofoils out of the water, releasing from water most of the hydrofoils surface and hence minimizing the parasitic resistance they would have when the vessel is navigating at low speed in displacement mode.

Preferably, each hydrofoil element is attached to an annular support which is rotating around and coaxial to the longitudinal (fore-aft) axis of the corresponding lateral hull.

In particular, to improve the hydro/aero dynamic characteristics of the mechanism of oscillation of the hydrofoil elements, the annular support consists of a ring belonging to the skin surface of the corresponding rigid lateral hull, to be perfectly integrated into a single smooth hull surface, without any steps or gaps.

Since the change in the behavior of the device changes from SWATH vessel to hydrofoil craft with increasing speed, it is particularly advantageous to provide for an automatic control unit responsible for the transition from active state to inactive state of the at least two hydrofoil elements. This control unit can be programmed by setting a certain limit speed, above which the watercraft device changes its operating condition automatically, during navigation, without the need of stopping the motion or manually as commanded by manned crew.

A remote control may also be included, which allows the transition from the inactive status to the active status, in the case of an autonomous surface vessel, i.e. without manned crew on board.

Preferably. the design of the entire structure is such that, in the inactive condition, it is possible to accommodate the hydrofoil elements in the space delimited by the central body, by the connecting arms and by the lateral hulls, so that the hydrofoil elements are for their most part emerged, in order to limit the action of the water flow on them, limiting the resistance to the motion of advance.

In one embodiment, each connecting arm has compartment housings, designed inside its volume, for hosting each hydrofoil element in the inactive position.

In this case, each connecting arm is aligned with each hydrofoil element, with respect to the fore-aft direction of the corresponding lateral hull, and in particular is mounted aft of the pivot bearing hydrofoil element, so to allow the complete rotation of the hydrofoil element and to integrate it completely into the structure of the connecting arm, creating a seamless surface.

The hydrofoil elements may consist of elements of any shape, to improve the hydrodynamic characteristics and increase their lift force in order to effectively realize the transition to the foilborne mode of the watercraft device subject of the present invention.

In particular, in one embodiment, these hydrofoil elements provide for a hybrid hydrofoil section shape that can overcome the limitation of supercavitating profiles: supercavitating profiles, in fact, possess an excellent efficiency and cavity stability at high speeds, but a poor efficiency at low speeds, when the phenomenon of cavitation does not occur.

The new profile is characterized by a forward part shaped like a supercavitating profile that, instead of having a blunt sharply truncated trailing edge, it is connected to an annex piece having a proper shape similar to a curved flap which ends with a pointed trailing edge, and it is connected to the forward part of the supercavitating profile through two stepped connections, one on the upper and one on the lower profile surfaces.

In a preferred embodiment, each hydrofoil element consists three pieces: a first piece that has one end connected to the supporting structure of the whole hydrofoil and the other end connected to a second piece which in turns is connected to a third piece.

One end of the first piece is extending from below the hydrofoil support structure integrated in the relative lateral hull and other end is connected to the second piece of the hydrofoil extending in a direction essentially perpendicular to the horizontal plane of the vessel; the second piece of the hydrofoil extends toward the opposite lateral hull with a given dihedral angle; the second piece eventually connects to the third piece, which extends in the direction substantially parallel to the horizontal plane of the vessel. In the active and immersed condition each third branch connects with the third branch of the element corresponding to the opposite wing, so that the two opposite hydrofoils form a seamless wing surface, which has a V shape with a flattened bottom part at the apex of the V, formed by the two third hydrofoil pieces.

In order to further improve the hydrodynamic characteristics, the second piece of each hydrofoil element extends in both directions, towards and opposite the other lateral hull, across the first almost vertical piece.

This way, the end of the second piece which connects to the first vertical piece is prolonged beyond the same, forming an external protruding win element which improves the global efficiency of the hydrofoil and increase the dynamic transverse stability of the watercraft device, when in foilborne mode.

In a preferred embodiment, each lateral hull has two hydrofoil elements so that the hydrofoil elements of the whole watercraft device are four in total. According to this embodiment, the four hydrofoil elements are hung in pairs to the corresponding lateral hull a two region, one near the stern and the other one near the bow of the lateral hulls, and when in the active immersed mode, form a single hydrofoil aft surface and a single hydrofoil fore surface, respectively.

In another embodiment, the aft hydrofoil area and fore hydrofoil area are positioned so as to present different distances from the horizontal plane of the device. This embodiment causes the vortex wake created by the fore hydrofoil not to impact on the aft hydrofoil surface, reducing the interference effect between the two lifting hydrofoils which is detrimental for the efficiency of the whole lifting surface system at high speeds.

In this embodiment, there are two hydrofoil elements for each lateral hull, and preferably the connecting arm of each lateral hull has a sufficient length to accommodate the two hydrofoil elements during the inactive mode.

It is possible to foresee any number of connecting arms and a particular implementation of the watercraft device has two arms connected to each of the lateral hulls.

Also in this case, each connecting arm is placed next to the support structure of each hydrofoil element. In particular, the connecting arms are placed in pairs near the bow and stern.

Independently from their number, the connecting arms have a horizontal section characterized by an airfoil shape.

Similarly to the forward and aft hydrofoil surfaces, the connecting arms can also have two by two different inclinations. In particular, the two connecting arms located near the bow of each lateral hull have a diverging direction towards the two lateral hulls, while the two connecting arms located near the stern of each lateral hull have a direction converging towards the two lateral hulls, or vice versa.

The different inclinations of the connecting arms at the bow and at the stern can help in decreasing hull resistance in calm water of the watercraft device, as the waves created by the fore pair of connecting arms do not affect, or do not infringe onto the aft pair, thus decreasing the action created by the wave motion on the emerged part of the device.

A further embodiment has each of the two lateral hulls with a substantially cylindrical symmetry and an intermediate constriction in the annular area between the bow and the stern main sections of the lateral hull.

The annular constriction enables the device to change the profile of the lateral hulls to find a proper shape that can obtain a positive wave cancellation effect between the forward and aft wave trains generated by the lateral hull, thus reducing the wave resistance associated with its advance motion in water.

Especially in the SWATH configuration, this feature permits a reduction in fuel consumption of the watercraft device at a given speed with respect to conventional SWATH vessels.

Additional embodiments of a watercraft device according to the present invention are primarily aimed at further improving the aero/hydro dynamic qualities of the entire watercraft device, especially in the active condition of hydrofoil elements, i.e. when the device behaves as a hydrofoil craft.

Therefore, in one embodiment, the central body is configured as a flat element with respect to the horizontal plane of the device and symmetrical with respect to the longitudinal axis of the device, in the way to be divided into two equal halves. Furthermore, the flat element has sections in the longitudinal transverse planes and that are shaped as wing profiles in order to better reduced the airborne drag, while giving a lift contribution to support the weight of the vessel at high speeds, with a good efficiency due to the wing in ground effect.

The improvements conceived to increase aerodynamic efficiency, both through the features of the hydrofoil surfaces and through the characteristics of the central body, provide for an innovative construction of a watercraft device according to the present invention.

This innovative design enables the watercraft device to leave the water as soon as it reaches the high speeds.

Under these conditions, the weight of the device is supported by both the central body, which contributes to lift about 15% to 30% of the total weight, and by the hydrofoil area which develops the remaining of the lift force to sustain the vessel.

Furthermore, as it will be fully described with illustrations of some embodiments, the hydrofoils surfaces in water are based on a supercavitating profile whose shape has been developed to achieve high hydrodynamic efficiencies throughout the entire speed range, going from take-off speed (25-30 knots) to maximum speed (80-120 knots).

The new supercavitating profile features an annex tail which is designed to improve the performance of the hydrofoil both in sub-cavitating conditions and in super-cavitating conditions, because it has such a shape that the annex remains within the cavitation bubble at supercavitating conditions, while allowing development of high lift forces in non-cavitating conditions with low associated drag, contrary to what could be achievable with conventional supercavitating hydrofoils with blunt truncated trailing edges.

The central body is thus shaped as a sort of wing to increase the lift of the device with the same or even better drag ratio of the hydrofoil elements and allowing at the same time both a faster and more efficient emergence of the device with increasing speed.

Preferably, to increase the above described effect, the two equal halves of the central body are joined in a well-proportioned way in the centerline section of the wing and form a keel with V-sections and curved walls, which has a parabolic symmetric shape with respect to the longitudinal axis and that is extended downward in the bow area.

Similarly, a tail device may also be designed at the stern. The two halves of the flattened central body are joined in a faired and opportunely shaped way in the centerline section of the wing and form a keel with V-sections and curved walls, which has a parabolic symmetric shape with respect to the longitudinal axis and that is extended downward in the stern area. These two appendages are optimized to increase the longitudinal stability of the vessel during take-off and landing on water while helping to develop a hydrodynamic lift during these transient maneuvers.

According to the above described featured, the flattened central body has a horizontal section that provides a parabolic profile, with the apex in the proximity of the bow.

Advantageously, at least one flap element can be provided at the stern of the central body that allows an increase in the lift of the device at low speeds, also facilitating pitching control of the vessel in foilborne mode.

This flap is mounted near the stern and may consist of a single element or made of multiple elements, preferably in a number and/or size needed to cover most of the stern profile to significantly increase the maximum lift during take-off and landing.

The invention also relates to other features that further improve the watercraft device and that are recited in the appended claims.

BRIEF DESCRIPTION OF THE DRAWINGS

These and other features and advantages of the present invention will be clearer from the following descriptions of some embodiments illustrated in the attached drawings in which:

FIG. 5a shows a perspective view, in which the embodiment includes a central body 11, two lateral hulls 12, two connecting arms 13 and four hydrofoil elements 2;

DETAILED DESCRIPTION OF EMBODIMENTS OF THE INVENTION

Figure 1:
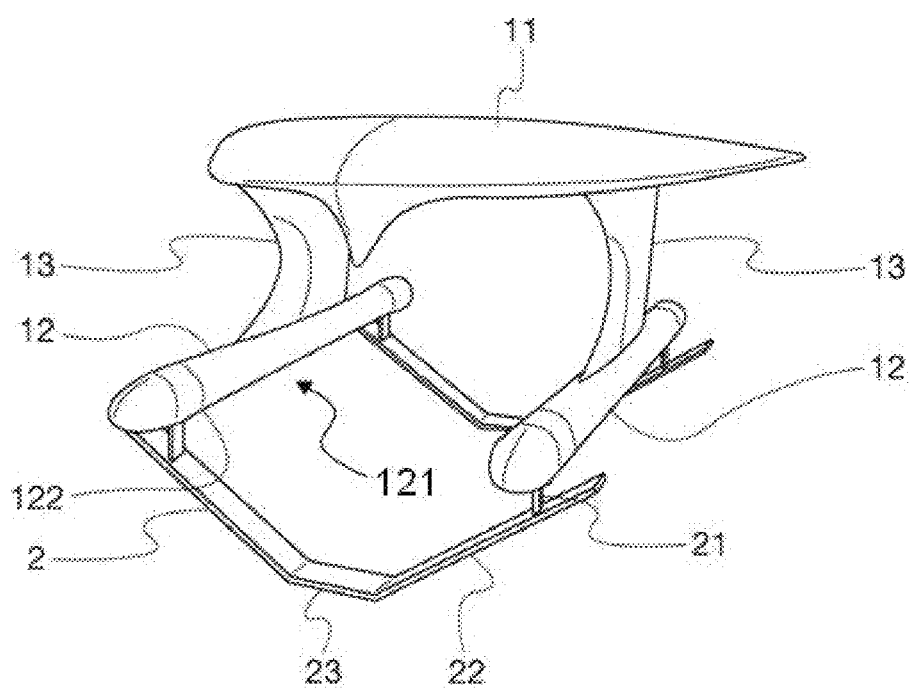
FIG. 1 illustrates a perspective view of the watercraft device according to a preferred embodiment of the invention.

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

In general, each rigid lateral hull 12 is connected to the main body 11 through a connecting arm 13 such that the central body 11 is in an elevated position with respect to the two lateral hulls 12. The connecting arms 13 have a certain inclination with respect to the horizontal plane of the device, while the two lateral hulls 12 and the central body 11 are oriented with their longitudinal axes, coincident with the fore-aft direction, substantially parallel to each other.

In particular, in FIG. 1, the two connecting arms 13 are connected to the bottom surface of the central body 11, but they can be mounted in any position, such as attached to the sides of the central body 11.

Additionally, each of the said two lateral hulls 12 has two hydrofoil elements 2 hanging below the corresponding lateral hull 12. Each hydrofoil element 2 essentially spans along a direction perpendicular to the longitudinal axis (bow-stern) of each hull 12 and towards the opposite lateral hull 12.

All four hydrofoil elements 2 are placed along the corresponding lateral hulls 12 so as to be coupled in pairs, so that for each hydrofoil element 2 there is a corresponding opposite hydrofoil element on opposite lateral hull.

Consequently, each hydrofoil element 2 has one end facing the opposite lateral hull 12 in contact with the end of the corresponding other hydrofoil element 2.

In this way the two hydrofoil elements belonging to different lateral hulls are joined together forming a single lateral surface.

Still referring to FIG. 1, the watercraft device presents each hydrofoil element 2 supported by a rotating structure around the longitudinal axis of the corresponding lateral hull 12, so that it is possible to rotate the hydrofoil from the immersed active condition to an inactive condition. FIG. 1 shows the device in the immersed active condition, in which each hydrofoil 2 is positioned entirely below the corresponding lateral hull 12 and the four hydrofoil elements 2 are connected to form two integrated wing surfaces. In the inactive condition, illustrated in the following figures, the end of the each hydrofoil element 2 facing the opposite lateral hull 12 is rotated upwards towards the upper central body (wing).

FIG. 1 also shows how each hydrofoil element 2 is attached to an annular support 122, which can be rotated and it is coaxial with the longitudinal axis of the lateral hull 12. In particular, the annular support 122 includes an annular band forming part of to the shell of the corresponding lateral hull 12.

With an increase in speed, the oscillating hydrofoil elements 2 allow the watercraft device to seamlessly switch from the hullborne (SWATH) operational mode to the foilborne operational mode.

Figure 2A:
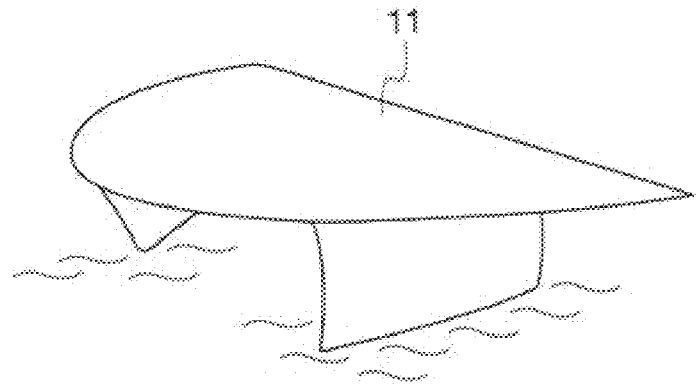
FIGS. 2a and 2b illustrate two perspective views of the embodiment of FIG. 1, showing the various operations of the watercraft device, as a SWATH (hullborne mode), FIG. 2a, and as a hydrofoil (foilborne mode), FIG. 2b.
Figure 2B:
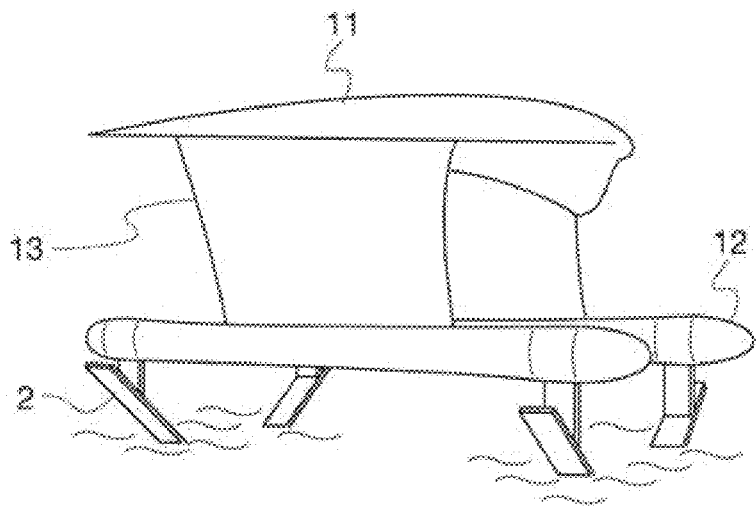

In particular, FIGS. 2a and 2b illustrate this change in operation. In FIG. 2a a watercraft device according to the present invention has the behavior of traditional SWATH devices, with an emerged part which is represented by the central body 11 and the upper part of the connecting arms 13, and an underwater portion that consists of the lateral hulls 12, the hydrofoil elements 2 and the remaining part of the connecting arms 13.

The particular shape of the central body 11 described below, together with deployed hydrofoil elements, are able to generate a lift force so that, with increasing speed, the device very rapidly takes-off, until changing to its pure foilborne operating mode.

In FIG. 2b the device has become a hydrofoil and it consists of a single emerged part which includes the central body 11, the lateral hulls 12, the connecting arms 13 and part of the hydrofoil elements 2. In this condition, the hydrofoil elements are combined in pairs to form a single wing surface on which the entire vessel navigates, similarly to some of the known state of the art hydrofoils.

According to the executive variant illustrated in FIGS. 1 to 4, each hydrofoil element 2 comprises a first branch 21, a second branch 22 and a third branch 23.

The first branch 21 extends inferiorly to support element 122 of the corresponding lateral hull 12 in a direction substantially perpendicular to the horizontal plane of the vessel and is connected to the second branch 22 that extends towards the opposite side of the hull 12 with a certain angle. In turn, the second branch 22 is connected to the third branch 23 that extends in a direction substantially parallel to the horizontal plane of the vessel.

The inclination of the second branch 22 and the positioning of hydrofoil elements 2 is such that the third branch 23 connects with the third branch of the corresponding element of the opposite hydrofoil element 2, in a submerged and active position, allowing these two hydrofoil elements 2 to form a single hydrofoil surface which has a V shape with the central part of the apex which is flat and formed by the two opposite third branches 23, connected together.

In particular, the flat V shape of the hydrofoil is obtained through the proper relative inclination of the three branches 21, 22 and 23, but the executive variants of the watercraft device of the present invention provide for the any shape of hydrofoil surface that may enable the watercraft device to operate as described above. An example is the W shape, instead of a V shape.

Again with reference to FIGS. 1 to 4, we see that the end of the second branch 22 in contact with the first branch 21 extends beyond the first branch 21, towards the free surface, when in active position, in order to create an additional lifting surface that increases the effective aspect ratio of the hydrofoil element 2 and increase the dynamic stability of the watercraft device when operating in foilborne mode.

It is specified that in FIGS. 1 to 4 the watercraft device subject of the present invention is presented according to one of the possible executions and in particular it is always shown with a single connecting arm 13 for each lateral hull 12. Other executive forms of the device, however, make use of two connecting arms 13 for each lateral hull 12. In this case it is preferable that the connecting arms 13 are mounted near the bow and the stern of the lateral hull 12 in the proximity of the supporting elements 122 of each hydrofoil element 2.

It is also possible to provide that the inclination of the connecting arms 13 is such that the two connecting arms positioned near the bow of each lateral hull 12 are inclined so to diverge towards the two lateral hulls 12, while the two connecting arms 13 positioned near the stern of each lateral hull 12 are inclined so to converge towards the two lateral hulls 12. Of course, it is possible to provide also the opposite configuration that is with the forward connecting arms 13 which are divergent going from the center body 11 to the lateral hulls 12, while the stern connecting arms 13 which are convergent going from the center body 11 to the lateral hulls 12. Eventually, according to this executive form, the connecting arms 13 are presenting in alternated pairs so that, when navigating, the waves created by the forward connecting pair of arms 13 do not affect the flow reaching the connecting arms 13 astern of the previous ones.

Regardless of the number of connecting arms 13, here it is specified that they have a horizontal section characterized by an airfoil, or otherwise it has a geometry designed to improve the its hydrodynamic properties (mainly resistance).

In addition, the executive variant illustrated in FIGS. 1 to 4 has four wings elements 2, i.e. two hydrofoil elements 2 for each lateral hull 12, respectively mounted near the stern and the bow of each lateral hull 12, in a way to form a pair of forward hydrofoil surfaces and another pair of aft hydrofoil surfaces, in immersed and active condition.

Figure 3A:
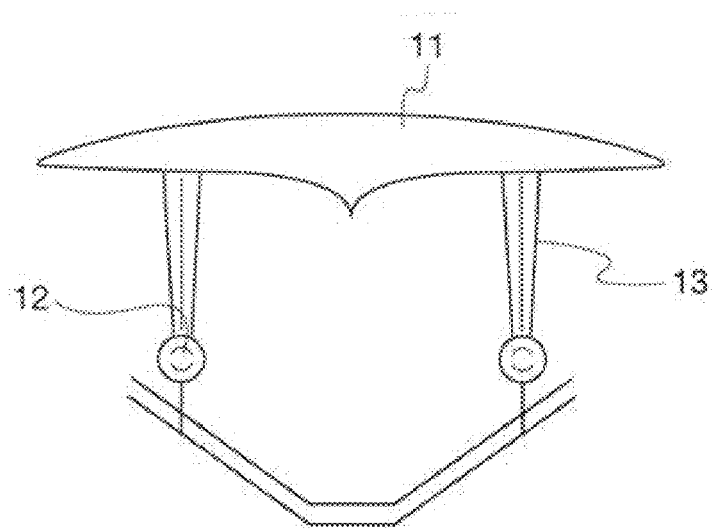
FIGS. 3a to 3c illustrate three views a the watercraft device according to the invention in the vertical plane, in which the hydrofoil elements pass from the immersed active position to the inactive condition.
Figure 3B:
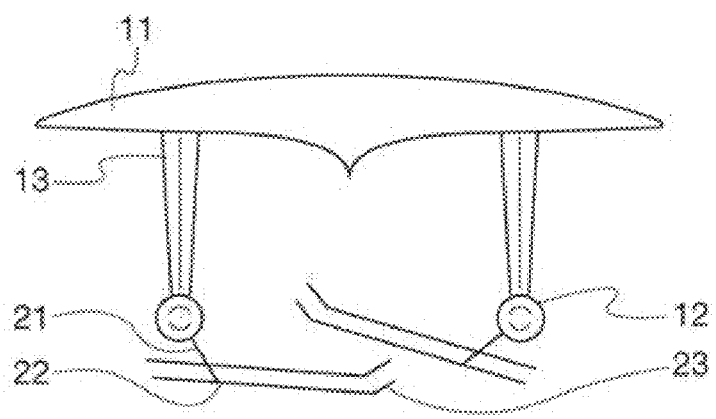
Figure 3C:
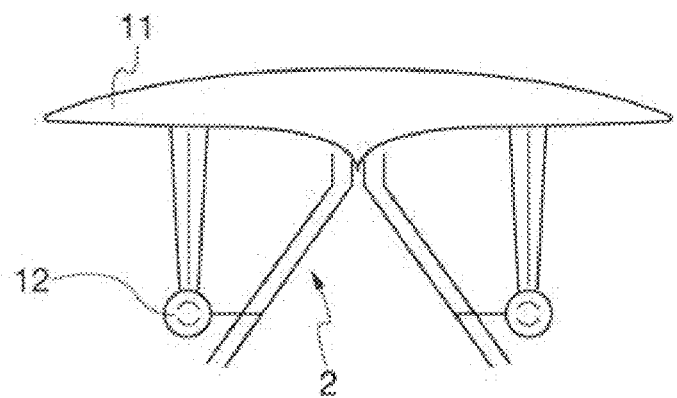

FIGS. 3a through 3c illustrate the transition from the immersed and active condition of the hydrofoil elements 2 to the inactive condition.

FIG. 3a shows the watercraft device subject of the present invention with the four hydrofoil elements 2 in the immersed and active condition. These hydrofoil elements 2 are joined in pairs by the third branches 23, as described above, so as to form only two continuous lifting surfaces, one at the bow and one at the stern of the vessel.

These lifting surfaces are positioned in such a way that they present a different distance from the horizontal plane of the watercraft device; or alternatively, they are positioned at different heights along the vertical axis of the device. This particular configuration provides for an improvement in the efficiency of the hydrofoil elements when the watercraft device operates in foilborne mode.

Accelerating over a certain speed, due to the effect of turbojets engines the watercraft device tends to naturally take off, using the lift of the center body 11 and the lift provided by the hydrofoil elements 2 that are exactly in the active condition and form two pair of wing surfaces, (continuous in some executive variants and separated in others) one in the fore part of the vessel and the other in the aft part of it, acting like surface piercing wings of a hydrofoil.

At lower speeds (see FIG. 3b), the emerged part of the device tends to decrease and the hydrofoil elements 2 leave their active configuration, by rotating their third branches 23 towards the central body 11, while the lateral hulls 12 begin to land and dive into water.

In FIG. 3c the speed has dropped to a certain value and the hydrofoil elements 2 are in inactive status so that the device can assume the operation of a traditional SWATH device.

The dimensions of the connecting arms 13 are such that the hydrofoil elements 2 in their inactive mode may rotate into a housing compartment 131 above the lateral hull 12, as out as possible from the water, in a position comprised below the central hull 11 and the connecting arms 13.

An executive variant provides that the connecting arms 13 have in their outer shell area a space for housing the hydrofoil elements 2.

In this case, each connecting arm 13 is mounted at a position in line with each hydrofoil element 2 with respect to the longitudinal axis of the lateral hull 12, and in particular it is positioned above the annular support 122 of the hydrofoil element 2 in order to allow the rotation of the hydrofoil element 2 until it almost disappear inside the structure of the connecting arm 12, creating a seamless surface.

According to an executive form an automatic control unit can be used, to control the transition from the active mode to the inactive mode of the hydrofoil elements 2. The automatic control unit may for example be triggered with minimum and maximum values of speed and, once these speeds are reached, it may start the control of the rotation of the hydrofoil elements in one direction or the other, enabling, at low speeds, the SWATH hull borne mode of operation, while at high speed, the foilborne operating mode for the vessel.

In particular, in FIGS. 1 to 4, the watercraft device is built according to an executive variant in which the lateral hulls 12 are made of a substantially cylindrical symmetric body that shows a reduced annular section 121 between the main section at the bow and stern of lateral hulls 12.

The lateral hulls 12 can be made of bodies of any shape, but preferably have such an annular constriction 121 to reduce the drag during hullborne operating mode, at speeds around cruise and take-off speeds.

The annular constriction 121 can be circular or elliptical or any other form, including irregular shapes.

FIGS. 4a to 4d illustrate some examples of realization of the central body 11.

In particular, the central body 11 is designed as an element that has a flattened shape with respect to the horizontal plane of the watercraft device and that is symmetrical about the longitudinal axis of the watercraft device such that the flattened part is divided into two equal halves 111 and 112.

In addition, the flattened element sections have airfoil shapes for improving the aerodynamic characteristics of the whole watercraft device.

In FIGS. from 4a to 4d you can see how the center body 11 is designed to improve the aerodynamic behavior of the whole watercraft device.

In particular, the two halves 111 and 112 are connected forming a proper and faired shape in the centerline section of the wing. This continuous surface forms a V-shaped keel 114 near the bow area, which develops in length along the longitudinal axis of the central body 11. This keel 114 presents deep-V sections with curved lines and a parabolic shape along the longitudinal axis. In particular, the stem of the keel 114 is gradually smoothed to the leading edge of flattened center body element, while the side and rear walls are joined in a similar manner with the bottom surface of flattened element.

In addition, the stem of the keel 114 is pronounced down in the bow area before rising up again towards the leading edge of the center body 11.

Figure 4A:
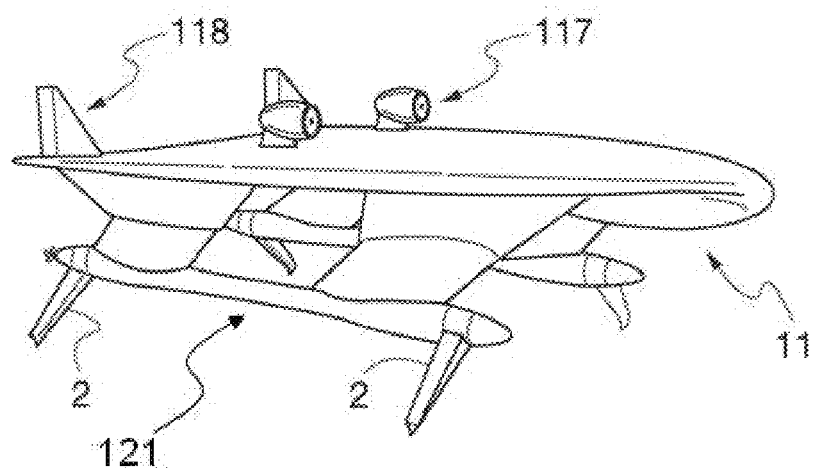
FIGS. 4a and 4b illustrate two views of an embodiment of a watercraft device according to the present invention, and in particular of its central body 11 connected with the side hulls by means of two connecting arms with contrary inclination angles and two pairs of supercavitating hydrofoils, in a perspective view and in a top plan view.
Figure 4B:
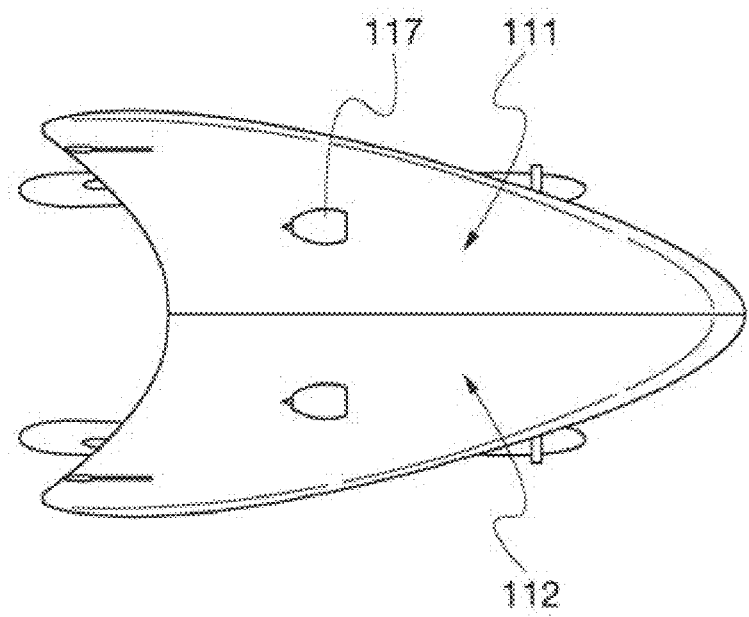

FIG. 4b shows a view in a horizontal plane of an executive variant of the central body 11 of the device subject of the present invention, according to which the flat element has a section with respect to the horizontal plane with a parabolic profile, with the vertex of the parabola positioned in the bow area of the central body 11.

Figure 4C:
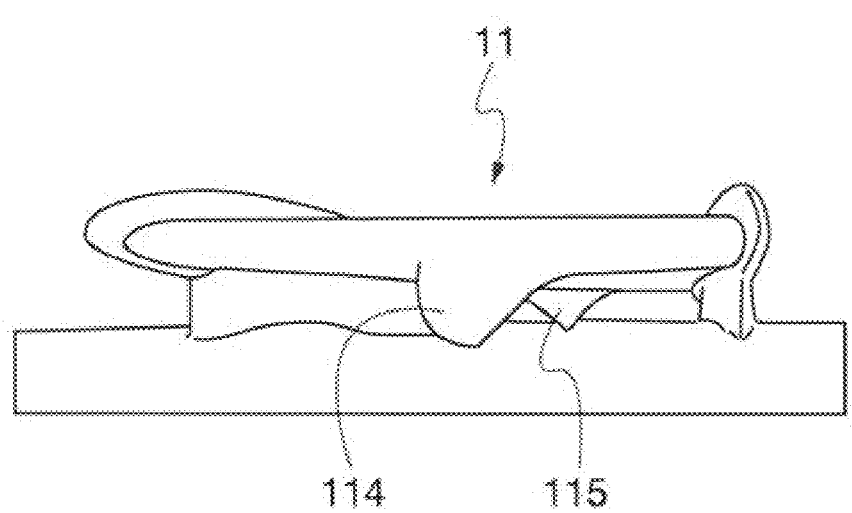
FIG. 4c illustrates a perspective view of the central body with the stern and bow keels, 114 and 113 respectively, in another embodiment of the invention.

Similarly as described for the bow keel 114, an executive variant of the central body 11, provides the construction of a tail keel 115 in the stern region, as shown in FIG. 4c. In fact the two halves 111 and 112 are connected along the longitudinal axis near the stern into a funnel shaped body in order to form continuous surfaces that make up the stern keel 115 which is characterized by Deep-V transverse section and with concave/convex lines, and this tail keel 115 has a symmetric parabolic shape with respect to the longitudinal direction and is pronounced down before rising up again to join the trailing edge of the center body 11.

Figure 4D:
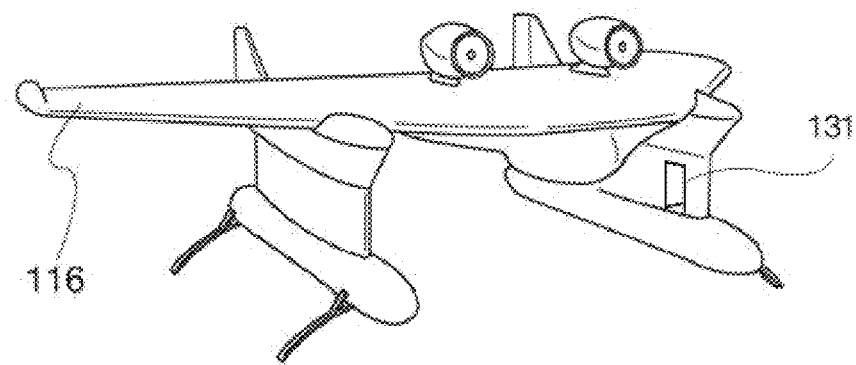
FIGS. 4d and 4e illustrate another embodiment of a device according to the invention, in particular of the central body, as a high aspect ratio wing with rotating tip end elements to provide additional longitudinal buoyancy stability during take-off and landing maneuvers.
Figure 4E:
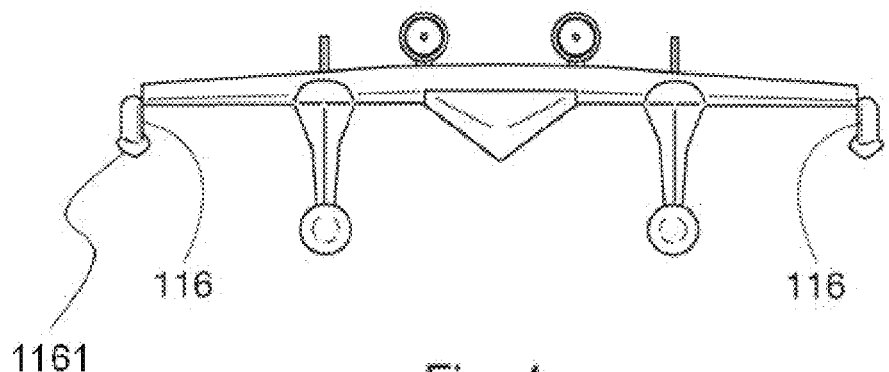

FIGS. 4d and 4e show two views of a possible form of implementation of the watercraft device, in particular of the central body 11, respectively, the perspective view and a front view (from the vertical plane).

In this implementation a terminal element 116 is provided at the tip of the wing 11, which has an opportune sweep back angle to bring these added tip elements 116 towards the extreme aft. In particular, these terminal elements are mounted at the stern area so as to be opposite one to each other.

These terminal elements or end pieces 116 are tilting with respect to an axis parallel to the longitudinal axis of the central body 11, such that the two terminals 116 can be brought from a coplanar position with respect to the horizontal plane of the central body (wing) 11 to an orthogonal position with respect to the horizontal plane of the central body 11.

In coplanar position the two terminals 116 form with the halves 111 and 112 a continuous surface that constitutes the whole flatten element and they contribute to develop the lift force of the main body 11.

In the tilted position the two terminals 116 contribute together with the connecting arms 1161 to provide a sufficient inertia of the composite total waterline figure, to ensure the adequate longitudinal hydrostatic stability of the watercraft device at rest and during operation in hullborne mode.

Still referring to FIGS. 4a to 4e, it is opportune to provide propulsion devices, such as turbo jets 117 or turbo-fans or similar systems, fitted above the center body 11 and used to self-propel the vessel at high speeds. In the figures, as more convenient to avoid sea water ingestion, the turbo jets are mounted on the upper surface, but it is possible to predict them both on the lower and in the upper surfaces of the center body 11, or on the sides, or in any position.

In addition to improving the aerodynamic characteristics of the watercraft device, and in particular of the central body 11, it is possible to provide the central body 11 with all the elements and means commonly used and known from the state of the art of aeronautical engineering. For example, on the upper surface of the wing element 11 at least one centerboard element such as a vertical rudder 118 is provided located near the tail of the said center body 11.

Alternatively or in combination, one or more lifting surface elements may be present on the tail of the center body 11 or at the stern or the connecting arms 13, such as flaps 119, horizontal rudders and other motion control surfaces, placed either in water or in air.

A further executive variant of the device subject of the present invention provides the use of three hulls, two lateral hulls and a central hull, this last positioned in the most forward position, at the bow. Each of the hulls is associated with at least one hydrofoil element and both hydrofoil elements and hulls present the characteristics described herein.

Figure 5A:
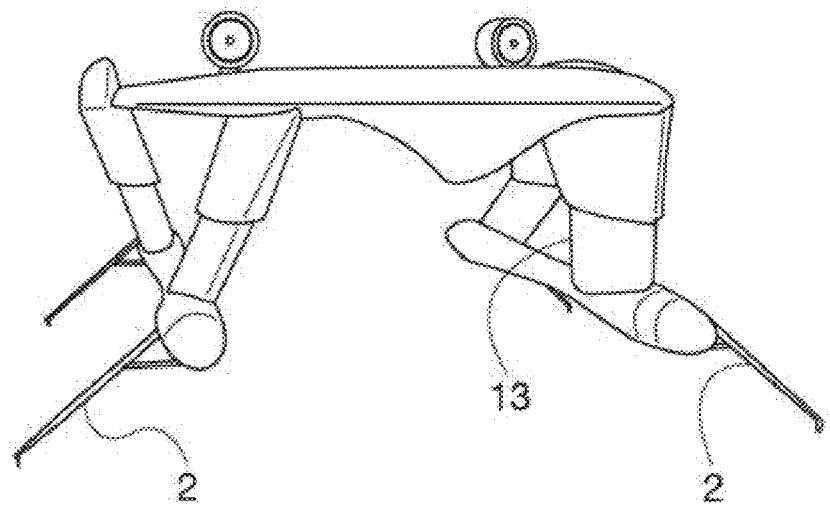
FIGS. 5a and 5b show two perspective views of a watercraft device in another embodiment of the present invention. In particular.
Figure 5B:
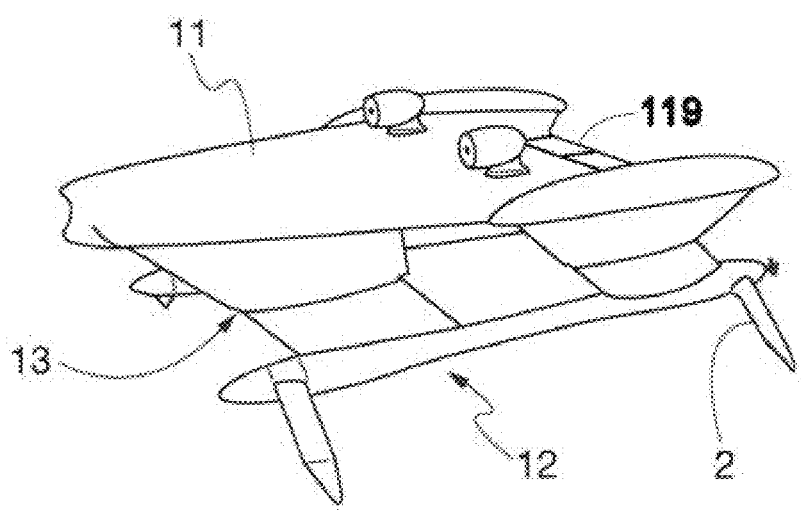

FIGS. 5a and 5b show an executive variant of the device object of the present invention in two perspective views.

In particular, this executive variant has all the features described above, especially the characteristics relating to the central body 11 and the hydrofoil elements 2.

As regards to hydrofoil elements 2, we can see how these elements are provided in the variant according to which they are hung from the lateral hulls, but instead of extending towards the opposite side of the hull, they extend outward of the corresponding lateral hull 12.

Obviously, the particular shape of the central body 11 and the connecting arms 13 shown in FIGS. 5a and 5b can be used with any configuration of the hydrofoil elements described so far.

Furthermore, the purpose of this variant is to focus on the particular form and inclination of the connecting arms 13.

The watercraft device shown in FIGS. 5a and 5b has four connecting arms, two arms for each lateral hull 12, where the connecting arms 13 at the bow have a different and opposite inclination than the connecting arms at the stern.

In particular, the connecting arms of the bow are divergent in the direction of the lateral hulls 12, while the connecting arms of the stern are converging in the direction of the lateral hulls 12. According to experimental studies conducted on the behavior of the device in water, it is preferable that the connecting arms have an inclination with respect to the vertical axis between 5 and 35 degrees, most often between 10 and 30 degrees.

It is therefore recommended that the connecting arms at the bow are inclined between 10 and 30 degrees anti-clockwise (as view from the bow), while the connecting arms at the stern should have an opposite inclination (so in a clockwise direction looking at the vessel from the bow) between 10 and 30 degrees.

The super cavitating SP (Surface Piercing) hydrofoils referring to the hydrofoil element 2, claimed in the invention, have been designed with particular transverse sections (profiles) to be efficient in both operating modes: at the take-off speeds around 25-30 knots where they operate in mostly wetted or partially cavitating conditions, as well as at full speed where they operate in super-cavitating conditions.

A hybrid method was used to design the surface piercing hydrofoils, which employs the traditional asymptotic theory as revised in Johnson, V. E., Theoretical and Experimental Investigation of Arbitrary Aspect Ratio, Super-cavitating Hydrofoils Operating Near the Free Surface, NACA RM L57I16 (1957), and a CFD model that solves for the incompressible Unsteady Reynolds Averaged Navier Stokes (URANS) Equations of a two phase fluid mixture along with the Sauer cavitation model, as described in Sauer, J., Instationär kavitierende Strömungen—Ein neues Modell, basierend auf Fron Capturing VOF and Blasendynamik, Ph.D. Dissertation, Universität Karlsruhe (2000) and the κ-ω SST turbulence model, as described in the document Wilcox, D., 1996, Turbulence Modeling for CFD, 2nd Ed. DCW Industries, Inc., La Canada, Calif., USA (1996).

Details of the design and comparisons of numerical predictions with model-scale experimental studies have been presented in Brizzolara, S., Federici, A., Super-Cavitating Profiles for Ultra High Speed Hydrofoils: a Hybrid CFD Design Approach. 9th Symposium on High Speed Marine Vehicles, HSMV 2011. Naples, March (2011), vol. 1, p. 1-13, ISBN/ISSN: 978889061120.

Unfortunately, the performance of conventional super-cavitating profiles belonging to the hydrofoil elements according to the prior art, in fully wetted conditions, is rather poor because the drag increases dramatically in fully wetted conditions due to the separated flow aft of the blunt trailing edge.

Figure 6A:
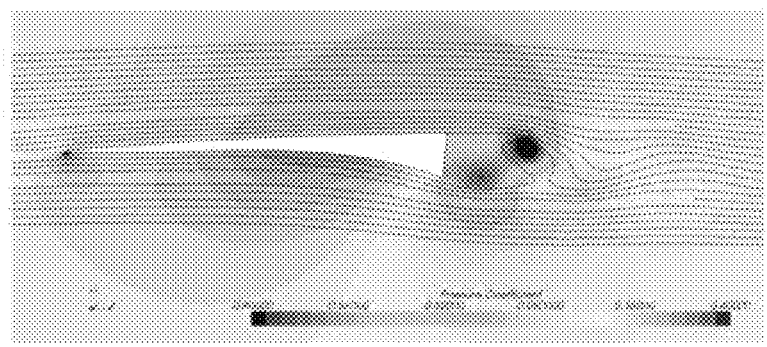
FIGS. 6a through 6c illustrate three sections of the hydrofoil element along a transverse plane to its spanwise axis, this section plane being also parallel to the longitudinal axis of the vessel.

An example of the predicted pressure coefficient $C_P$ contours and flow streamlines for a super-cavitating (SC) section with a Johnson 3—terms profile operating in fully wetted conditions at an angle of attack, $\alpha$, of 5 degrees is shown in FIG. 6a; alternating vortices are observed to shed from the blunt trailing edge, and the resulting mean lift to drag ratio (L/D) of the 2D hydrofoil is approximately 6.

Figure 6B:
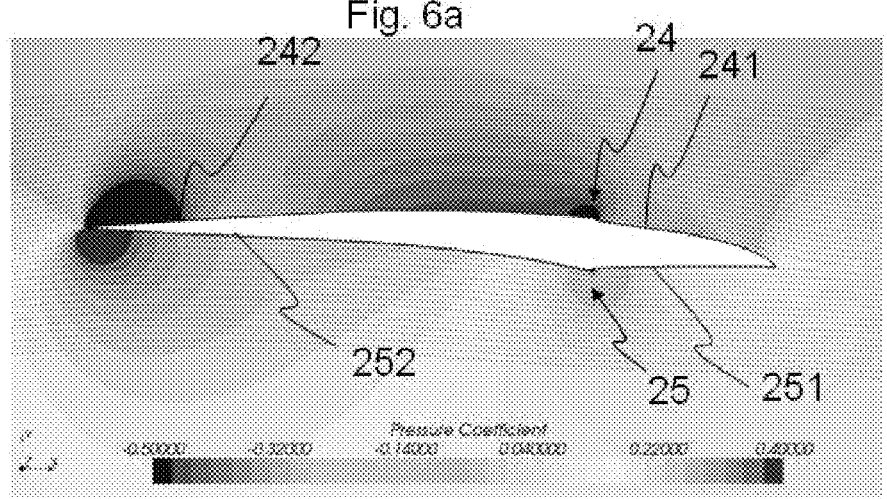

To improve the efficiency at fully wetted conditions, FIG. 6b shows how the new hybrid profile of the hydrofoil element 2 of the present invention works. The new profile features a properly shaped annex aft of the truncation line. The shape of the back and face of the profile corresponds to a Johnson three terms profile, which has been optimized to obtain a sufficiently thick cavity at top speed to ensure stable supercavitating regime over a relatively wide range of speeds below the design condition. The annex shape has been designed to develop extra lift and obtain good efficiency in wetted or partly cavitating conditions during take-off. The annex is connected to the main supercavitating section through two cusped points 24, 25 with proper relief radius to trigger/control the detachment location of the base cavitation at intermediate speeds.

In particular FIGS. 6a and 6b show a section of the hydrofoil element 2, along a vertical plane which is composed of two parts: a fore part and an aft part.

The fore part consists of two curved convergent surfaces 241 and 251, while the aft part consists of two convergent surfaces 242 and 252; where the said curved surfaces 241 and 251 are connected to the curved surfaces 242 and 252.

The type of junction between each of the convergent surfaces 242 and 252 and the corresponding one of the divergent surfaces 241 and 251 results in an outward facing step 24, 25, protruding toward the water.

The connecting step lines 24 and 25 can span the complete hydrofoil surface 2 in a perpendicular direction with respect to the intersecting plane of the hydrofoil profiles 6a and 6b.

Figure 6C:
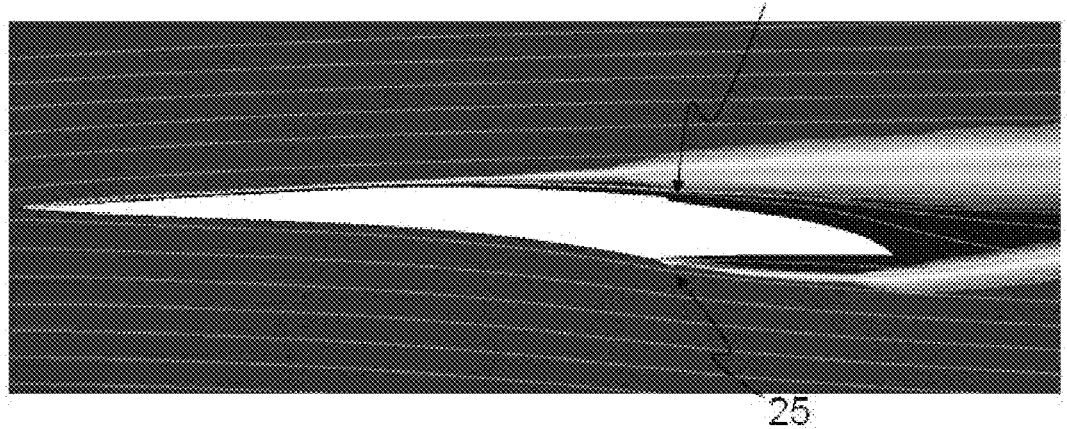

While the conventional truncated super-cavitating (SC) profile of FIG. 6a has a lift to drag ratio of L/D=6 in fully wetted condition at $\alpha=5°$, the new hybrid section shown in FIG. 6b has L/D=26 at the same flow conditions, with pressure distribution and streamlines presented in FIG. 6a. The new hybrid profile is considerably more efficient than conventional super-cavitating (SC) sections, and has an L/D that is comparable to the best of NACA airfoil sections in fully wetted condition. Moreover, the new profile is able to achieve an L/D≈12 at super-cavitating condition, at its design angle of attack ($\alpha=5$ deg), with the predicted cavitation pattern of FIG. 6c, which shows the pressure coefficients and flow streamlines around the new dual mode hybrid SC profile operating in supercavitating condition at the design angle of attack. $\alpha=5$ deg, $\sigma=0.05$, Re=$32 \cdot 10^6$.

It should be noted that the thickness of the annex is designed to provide the sufficient bending stiffness while maintaining good efficiency. Nevertheless, there is a drawback because of the limited stability of the supercavity with changes in the angle of attack from its design value. In fact, the supercavity changes to base cavity only when the angle of attack is reduced from 5 to 3 degrees. On the other hand, as expected, the cavity length and thickness increases as the angle of attack increases from the designed value of 5 deg.

Figure 7:
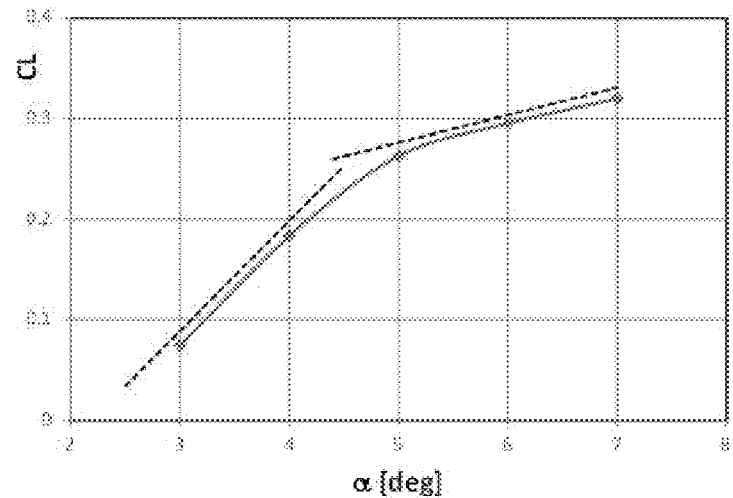
FIG. 7 shows a diagram that describe predicted lift coefficient vs. angle of attack of an execution of the new supercavitating profile of the hydrofoil element that is also part of the present invention.

The predicted lift coefficient vs. angle of attack for the new profile operating at the design cavitation index $\sigma=0.05$, is presented in FIG. 7. Validation of the CFD predictions with experimental measurements can be found in Brizzolara, S., Federici, A., Super-Cavitating Profiles for Ultra High Speed Hydrofoils: a Hybrid CFD Design Approach. 9th Symposium on High Speed Marine Vehicles, HSMV 2011, Naples (March 2011), vol. 1, p. 1-13, ISBN/ISSN: 978889061120.

The slope of the $C_L$-$\alpha$ curve from the CFD predictions compared well with linear theory predictions for both the fully wetted region ($\alpha<4$) and the supercavitating regime ($\alpha\geq5$). The dotted straight lines shown in FIG. 7, in fact, correspond to linear theory predictions, where the slope are equal to $2\pi$ and $\pi/2$, respectively in the fully wetted and supercavitating regimes. The transition between the wetted and supercavitating conditions is quite smooth, due to the base cavitating condition of the profile triggered, also at the lower cavitation indexes, by the two cusped points 24, 25.

Figure 8:
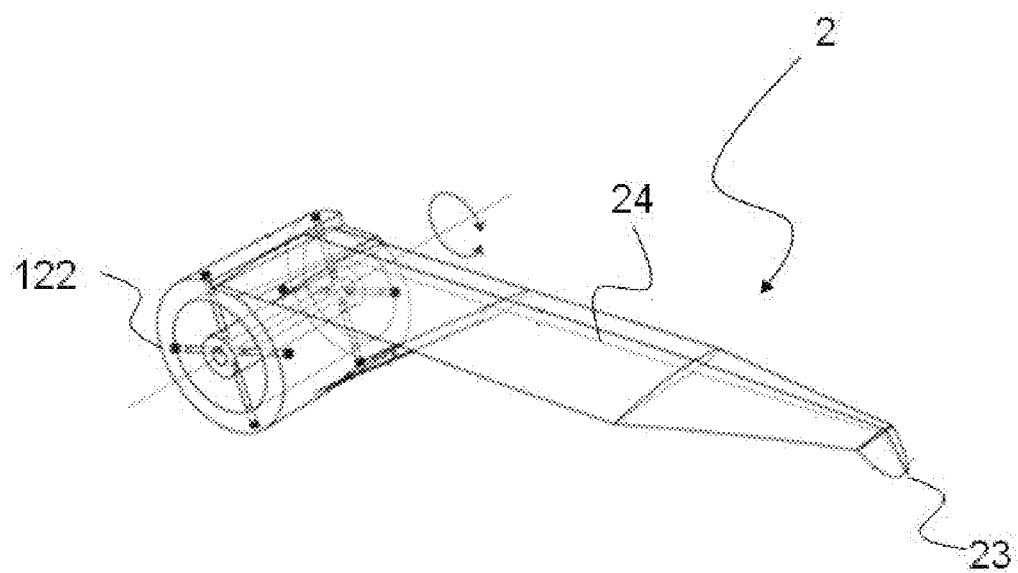
FIG. 8 shows a perspective view of an embodiment of a hydrofoil element of a watercraft device according to the present invention.

Based on the new dual mode super cavitating (SC) profile, the surface piercing hydrofoil shown according to the present invention is shown in FIG. 8, having a trapezoidal planform around the design submergence and a rectangular portion to be submerged only at lower speeds. The winglet at the tip 23 is useful not only to reduce the induced drag by increasing the effective aspect ratio of the foil, but also for reducing the shock entry of the foil into water, in case of roll and temporary emergence of the foil above the free surface.

The hydrofoil has a constant maximum camber to chord ratio, but the geometric angles of attacks vary along the span to achieve the optimum circulation distribution as predicted with a modified lifting line method which allow a calculation of the optimum load distribution of a supercavitating hydrofoil with free surface proximity effects, and the effects of the dihedral and sweeping angles.

The design criteria, which drove the shape of the Super Cavitating (SC) Surface Piercing (SP) hydrofoil shown in the FIGS. 6b to 8, can be summarized as follows:

(A) Keep the cusped point line straight;

(B) Ensure strength requirements are satisfied to withstand full scale bending forces with a sufficient allowance to account for fatigue and stochastic nature of sea loads;

(C) Achieve optimum lift distribution along the span by varying the angle of attack of the local sections (warped wing) while maintaining the maximum camber to chord ratio (in order to use the same 2D profile presented in FIG. 8.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

The invention claimed is:

1. A watercraft device comprising:
a central body;
two lateral hulls; and
two or more connecting arms each connecting the central body to one of the lateral hulls, such to cause the central body to be in a raised position relative to the lateral hulls, the two or more connecting arms having a given inclination relative to a horizontal plane of the watercraft device,
wherein the two lateral hulls and the central body have longitudinal axes parallel to each other,
wherein each of the two lateral hulls has a hydrofoil element disposed therebelow,
wherein the hydrofoil element extends substantially perpendicular to the longitudinal axis of a respective lateral hull, and
wherein each hydrofoil element is rotatable about the longitudinal axis of the respective lateral hull, thereby moving from an immersed state, in which the hydrofoil element is entirely located below the respective lateral hull, to an idle state, in which at least an end of the hydrofoil element facing the opposite lateral hull of said hydrofoil element is located above the respective lateral hull.

2. The watercraft device as claimed in claim 1, wherein each hydrofoil element is disposed toward an outside of the respective lateral hull.

3. The watercraft device as claimed in claim 1,
wherein each hydrofoil element extends is disposed toward the opposite lateral hull, and
wherein both hydrofoil elements are located at a same distance from bow and stern of the respective lateral hull, and
wherein each hydrofoil element has one end facing towards the opposite lateral hull, the ends of the hydrofoil elements being in mutual contact, such that the hydrofoil elements are joined together to form a single wing surface.

4. The watercraft device as claimed in claim 1, wherein, in the immersed state, the hydrofoil elements are connected together to form a single hydrofoil surface.

5. The device as claimed in claim 1, further comprising an automatic control unit configured to switch from the immersed state to the idle state of the hydrofoil element.

6. The watercraft device as claimed in claim 1, wherein the connecting arms are of such a size that the watercraft device has an area between the central body and the two lateral hulls suited for receiving the hydrofoil elements in the idle state.

7. The watercraft device as claimed in claim 1, wherein each of the connecting arms includes a housing compartment for receiving each hydrofoil element in the idle state, and wherein each of the connecting arms is located at a same distance as the hydrofoil element corresponding thereto from bow to stern of the respective lateral hull.

8. The watercraft device as claimed in claim 1, wherein the hydrofoil element hangs from an annular support, which is rotatable and coaxial with the longitudinal axis of the respective lateral hull.

9. The device as claimed in claim 8, wherein the annular support comprises an annular band forming part of a shell surface of the respective lateral hull.

10. The watercraft device as claimed in claim 8,
wherein the hydrofoil element comprises a first branch extending below the annular support of the respective lateral hull in a direction substantially perpendicular to the horizontal plane of the watercraft device, and a second branch connected to the first branch and extending toward the opposite lateral hull with a given inclination, the second branch being connected to a third branch extending substantially parallel to the horizontal plane of the watercraft device, the third branch being connected with a corresponding third branch of the opposite hydrofoil element such that, in the immersed state, two hydrofoil elements form a seamless V-shaped wing surface having a vertex with a flattened central portion, formed of the two third branches.

11. The watercraft device as claimed in claim 10, wherein the second branch extends toward the opposite lateral hull, stretching in a direction of the opposite lateral hull and in a direction of the respective lateral hull, such that an end of the second branch proximate to the first branch extends beyond the first branch.

12. The watercraft device as claimed in claim 1, wherein the hydrofoil element has a section profile in a vertical plane oriented along a bow-stern direction comprising a fore part and an aft part,
wherein the fore part comprises two divergent curved surfaces and the aft part comprises two convergent curved surfaces, the convergent curved surfaces joining the divergent curved surfaces,
wherein a junction device between the convergent and divergent curved surfaces defines a step, and
wherein a cross-section of the fore part is shorter than a cross-section of the aft part of the step.

13. The watercraft device as claimed in claim 1, wherein each lateral hull has two hydrofoil elements, each hydrofoil element being mounted proximate to stern and bow respectively of each of the two lateral hulls to form an aft hydrofoil surface and a fore hydrofoil surface in an immersed state.

14. The watercraft device as claimed in claim 13, wherein the aft wing surface and the fore wing surface, in the immersed state, are in such position that the aft wing surface has a different distance from the horizontal plane of the watercraft device than the aft wing surface.

15. The watercraft device as claimed in claim 1, wherein each connecting arm has a hydrofoil profile.

16. The watercraft device as claimed in claim 1, wherein each lateral hull has two connecting arms connecting to the central body, and wherein each connecting arm is mounted proximate to stern and bow of each of the lateral hulls at each hydrofoil element.

17. The device as claimed in claim 16, wherein the given inclination of the connecting arms is such that the two connecting arms proximate to bows of the lateral hulls have a diverging direction relative to the lateral hulls, and wherein the two connecting arms proximate to sterns of the lateral hulls have a converging direction relative to the lateral hulls, or vice versa.

18. The watercraft device as claimed in claim 1, wherein each of the lateral hulls comprises a body having a substantially cylindrical symmetry, with an annular constriction between bow and stern of the lateral hull.

19. The watercraft device as claimed in claim 1, wherein the central body comprises a flattened element that is flattened along the horizontal plane of the watercraft device,
wherein the flattened element is symmetrical relative to a longitudinal axis of the watercraft device, such that the flattened element has two identical halves, and
wherein the flattened element has a longitudinal section and a transverse section both with a hydrofoil profile.

20. The watercraft device as claimed in claim 19, wherein the two halves of the central body are connected along a longitudinal axis of the flattened element,
thereby forming a bow keel having a V-shaped section and curved walls, the bow keel having a parabolic profile, symmetrical relative to the longitudinal axis of the flattened element, the bow keel protruding downward in a fore area.

21. The watercraft device as claimed in claim 19, wherein the two halves of said central body are connected along a longitudinal axis of the flattened element,
thereby forming a tail keel having a profile, which is symmetrical relative to the longitudinal axis of the flattened element, the tail keel protruding downward an aft area.

22. The watercraft device as claimed in claim 19, wherein the flattened element has a parabolic section relative to the horizontal plane, with a vertex proximate to a fore area.

23. The watercraft device as claimed in claim 19,
wherein the flattened element has an end piece for each of the two halves of the central body, the two end pieces being located at an aft area, such that one end piece is opposite the other end piece, each of the two end pieces being rotatable about an axis parallel to a longitudinal axis of the central body, and
wherein the two end pieces are rotatable from a position in which the two end pieces are coplanar with a horizontal plane of the central body to a position in which the two end pieces are inclined relative to the horizontal plane of the central body.

24. The watercraft device as claimed in claim 19, further comprising propulsion device disposed on a surface of the flattened element for propelling the watercraft device.

25. The watercraft device as claimed in claim 19, further comprising a centerboard element on an upper surface of the flattened element, the centerboard element being located proximate to a stern of the watercraft device.

26. The watercraft device as claimed in claim 1, further comprising a flap element located proximate a stern of the central body.

27. A central hull for a small waterline area twin hull (SWATH) watercraft, comprising:
a flattened element disposed along a horizontal plane of a central hull,
wherein the flattened element is symmetrical relative to a longitudinal axis of a watercraft device, the flattened element being divided into two identical halves,
wherein the flattened element has a longitudinal section and a transverse section both having a hydrofoil profile, and
wherein the SWATH watercraft further comprises:
two lateral hulls; and
two or more connecting arms each connecting the central hulls to one of the lateral hulls, such to cause the central hull to be in a raised position relative to the lateral hulls, the two or more connecting arms having a given inclination relative to a horizontal plane of the watercraft device,
wherein the two lateral hulls and the central hull have longitudinal axes parallel to each other,
wherein each of the two lateral hulls has a hydrofoil element disposed therebelow,
wherein the hydrofoil element extends substantially perpendicular to the longitudinal axis of a respective lateral hull, and
wherein each hydrofoil element is rotatable about the longitudinal axis of the respective lateral hull, thereby moving from an immersed state, in which the hydrofoil element is entirely located below the respective lateral hull, to an idle state, in which at least an end of the hydrofoil element facing the opposite lateral hull of said hydrofoil element is located above the respective lateral hull.

28. The central hull as claimed in claim 27, wherein, in the immersed state, the hydrofoil elements are connected together to form a single hydrofoil surface.

* * * * *